United States Patent [19]

Midden

[11] Patent Number: 5,423,245

[45] Date of Patent: Jun. 13, 1995

[54] MILK FOAMING DEVICE

[75] Inventor: William E. Midden, Springfield, Ill.

[73] Assignee: Bunn-O-Matic Corporation, Springfield, Ill.

[21] Appl. No.: 226,880

[22] Filed: Apr. 13, 1994

[51] Int. Cl.⁶ .................. A47J 31/40; A47J 31/46; A47J 43/12; B01F 13/02

[52] U.S. Cl. ..................... 99/275; 99/323.1; 99/323.3; 99/452; 99/453; 239/445; 366/101; 366/139; 366/165.2

[58] Field of Search ................. 99/275, 323.1, 323.3, 99/452, 453, 454; 137/888, 889, 893, 801; 239/445, 414, 419, 432; 261/75, 93, DIG. 7, DIG. 16; 366/139, 150, 163, 101, 176, 341; 426/477

[56] References Cited

U.S. PATENT DOCUMENTS

| | | | |
|---|---|---|---|
| 2,060,551 | 11/1936 | Brantly | 239/445 |
| 2,558,700 | 6/1951 | Burgess | 239/445 X |
| 2,657,952 | 11/1953 | Mendonca | 239/445 |
| 3,093,316 | 6/1953 | Hedeman | 239/445 |
| 3,144,967 | 8/1964 | McClain | 239/445 |
| 3,727,640 | 4/1973 | Sargeant | 99/275 |
| 4,144,293 | 3/9179 | Hamoto et al. | 261/DIG. 16 |
| 4,219,134 | 8/1980 | Wiesner | 366/165 |
| 4,552,286 | 11/1985 | Kuckens et al. | 99/323.1 |
| 4,620,953 | 11/1986 | Silla et al. | 99/453 |
| 4,715,274 | 12/1987 | Paoletti | |
| 4,735,133 | 4/1988 | Paoletti | 99/454 |
| 4,779,519 | 10/1988 | Giuliano | |
| 4,922,810 | 5/1990 | Siccardi | |

*Primary Examiner*—Timothy F. Simone
*Attorney, Agent, or Firm*—Trexler, Bushnell, Giangiorgi & Blackstone, Ltd.

[57] ABSTRACT

A milk foaming device for emulsifying steam, milk and air to produce foamed milk. The milk foaming device includes an ingredient combining assembly for combining the steam, milk and air connected to a swirl chamber for blending the ingredients. A discharge tube is attached to the swirl chamber for dispensing foamed milk therethrough. A concave notch is formed in the walls of the discharge extending from a dispensing port of the tube upwardly along the walls. The notch retards or prevents formation of bubble surfaces over the dispensing port of the discharge tube and thereby prevent splattering of milk. A laminator is provided in the tube and extending therefrom for inducing a columnar flow of foamed milk from the discharge tube.

10 Claims, 1 Drawing Sheet

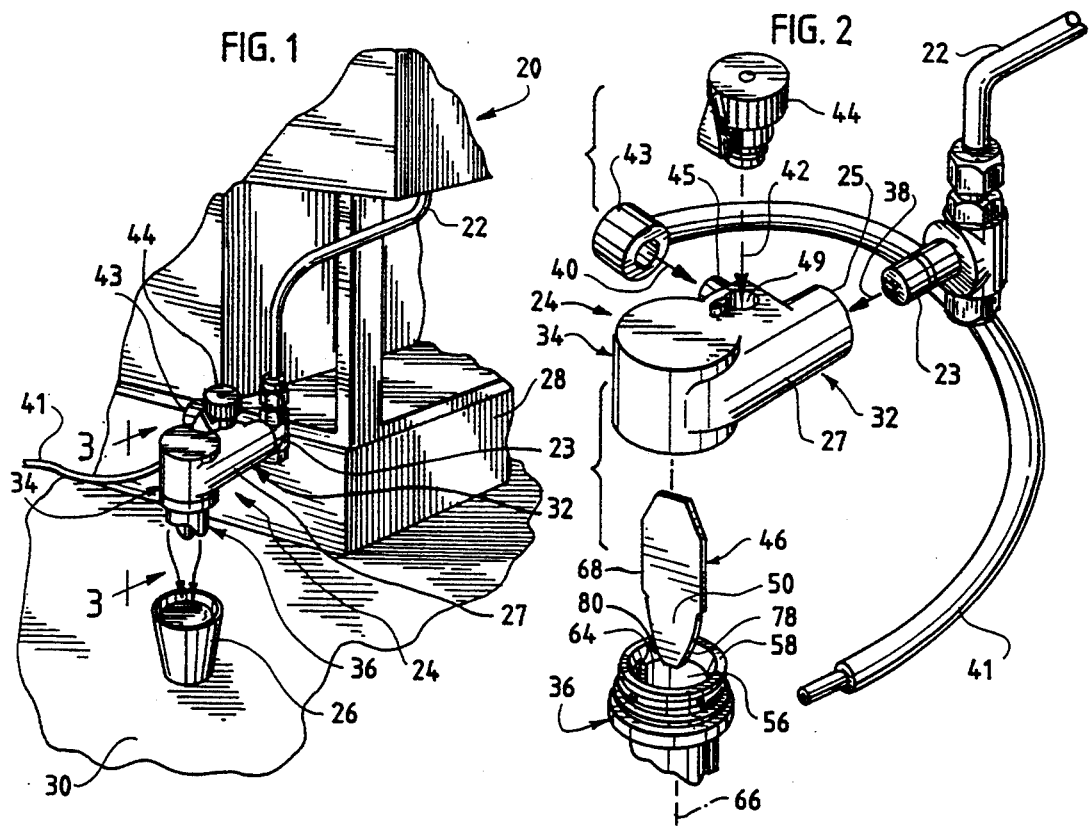
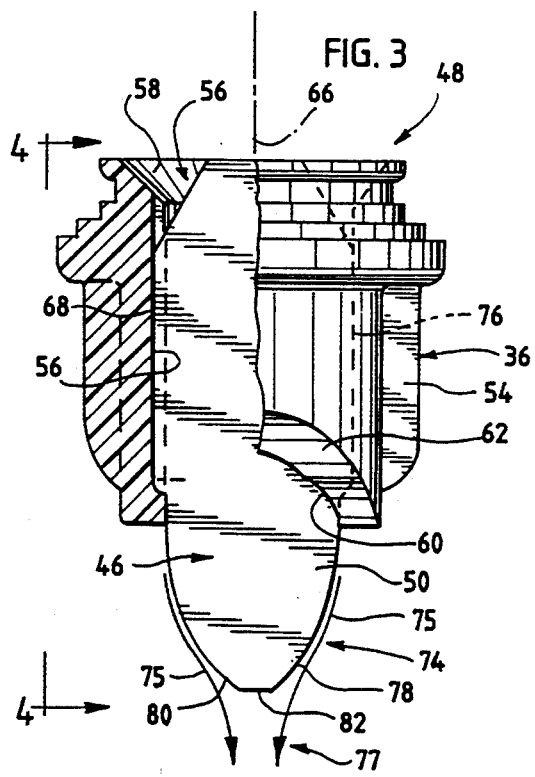
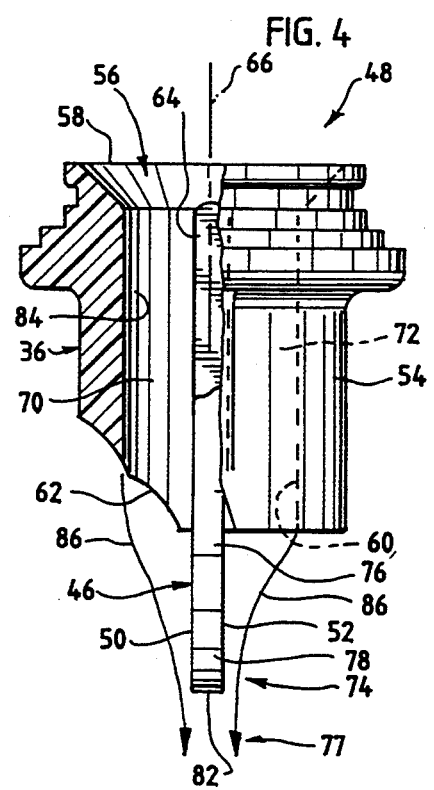

MILK FOAMING DEVICE

BACKGROUND

The present invention relates to milk foaming devices and a dispensing assembly for use with a milk foaming device.

People all over the world enjoy coffee beverages and are increasingly demanding the "classic" coffee beverages made with espresso. Espresso is the essence of the coffee bean which many fanciers of coffee believe gives the richest, most complex flavor of the beverage. The "classic" espresso beverages include such beverages as caffé latte, cappuccino, and espresso macchiato. These "classic" espresso-type beverages use one or more shots of espresso in combination with steamed milk, a quantity of foamed milk, or both. For example, the caffé latte uses one shot of espresso with a volume of steamed milk topped off with foamed milk. The cappuccino uses the foamed milk as a primary ingredient with the addition of a smaller volume of steamed milk and a shot of espresso. The espresso macchiato uses a single shot of espresso with a dollop of foamed milk as garnish or as a flavor and heat-retaining cap.

As can be seen from above, the steaming and especially the foaming of milk is essential to these popular "classic" espresso drinks. The milk is critical because it provides flavor, texture, as well as garnish for these espresso drinks. Additionally, foamed milk is used in other beverages such as steamed or hot cocoa, "steamers" combining steamed milk and a flavoring syrup, as well as any other application where the flavor, texture and garnishing effect of foamed milk is desired.

Prior art milk foaming techniques involved the time consuming and highly skilled ability to steam a pitcher of milk to produce milk foam having a desired loft and consistency. Milk is foamed at an espresso machine by a barista who operates the espresso machine. The espresso machines includes a steam wand connected to a steam source in the machine to provide steam in order to steam milk to produce milk foam. Because the prior art milk steaming techniques require manual steaming and human judgment, they required a level of skill only acquired through teaching and apprenticeship. Additionally, the foaming of milk requires a considerable amount of time in order to bring chilled milk up to a temperature of approximately 170° F. and the proper placement and repositioning of a steam nozzle.

In view of the increasing popularity of espresso drinks, as well as the desire to produce products more consistently and economically, automatic milk foam dispensers have been created. Examples of prior art milk foam dispensers are shown generally in U.S. Pat. No. 4,779,519 to Giuliano and U.S. Pat. No. 4,715,274 to Paoletti. These automatic milk foaming devices combine steam, air and milk in a swirl chamber to produce foamed milk. Both the Giuliano and Paoletti devices dispense foamed milk from the swirl chamber through an opening in the bottom thereof. Both devices also include a baffle or partition positioned in the swirl chamber to slow down the swirling of the foamed milk. These prior art devices help reduce the skill required to operate a milk foaming device, make it more economical since only a needed quantity of milk is used instead of heating a whole pitcher, increase the consistency of the foamed milk produced by these devices, and increase the speed at which the foamed milk can be faster since the time needed to heat up a pitcher of milk is not required.

Additional characteristics that are important to serving foamed milk in coffee beverages or other applications, is the presentation, sanitation and ease of cleanup. Presentation is important since it is desirable to dispense foamed milk into the selected container without overfilling or spraying the container. This is important to sanitation in that each cup of beverage need not be wiped and the milk foamer can be easily cleaned. The easiest milk foaming device to maintain is one that generally is the more sanitary device.

The prior art automatic milk foaming devices generally have problems with presentation, sanitation and cleanup. The devices as shown in Giuliano and Paoletti tend to splatter or spray the foamed milk foam out of the swirl chamber. The splattering of milk is a presentation problem since the milk may foam over on the cup or saucer requiring cleanup of each serving. The splattering problem also creates a sanitation problem in that the beverage serving requires additional handling in order to cleanup the splattered milk. Another sanitation problem is created by the splattering of the milk on the outside of the dispensing device. As the milk is very hot it tends to crust on the outside making cleanup difficult. Efficiency is adversely affected as a result of the prior art presentation, sanitation and cleanup problems. Efficiency is affected since time is required to remove the splattered milk from the beverage serving as well as cleaning up the dispensing device.

Therefore, it would be desirable to provide an automatic milk foaming device which dispenses foamed milk into a container without splattering. Such a device would prevent the presentation, sanitation and cleanup problems discussed hereinabove. Such a device would also increase the efficiency of an operation employing foamed milk in its food service products.

OBJECTS AND SUMMARY

A general object of the present invention is to provide a milk foaming device which prevents foamed milk from spraying or splattering when dispensed from the automatic milk foaming device.

Briefly, and in accordance with the foregoing, the present invention envisions a milk foaming device for emulsifying steam, milk and air to produce foamed milk. The milk foaming device includes an ingredient combining assembly for combining the steam, milk and air connected to a swirl chamber for blending the ingredients. A discharge tube is attached to the swirl chamber for dispensing foamed milk therethrough. A concave notch is formed in the wall of the discharge extending from a dispensing port of the tube upwardly along the walls. The notch retards or prevents formation of bubble surfaces over the dispensing port of the discharge tube and thereby prevent splattering of milk. A laminator is provided in the tube and extending therefrom for inducing a columnar flow of foamed milk from the discharge tube.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which:

FIG. 1 is a perspective partial fragmentary view of a portion of an espresso machine including an automatic milk foaming device of the present invention attached thereto;

FIG. 2 is an exploded perspective view of the milk foaming device as shown in FIG. 1;

FIG. 3 is an enlarged partial fragmentary elevational view of the discharge tube taken along line 3—3 in FIG. 2 showing a laminator retained in and extending from a dispensing tube associated with the milk foaming device; and FIG. 4 is a partial fragmentary cross-sectional view of the discharge tube taken along line 4—4 in FIG. 3.

DETAILED DESCRIPTION OF THE PREFERRED EMBODIMENT

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

FIG. 1 shows a portion of an espresso machine 20 for making espresso beverages. The espresso machine includes a steam wand 22 extending therefrom and providing a source of steam. A milk foaming device 24 is attached to the steam wand 22 to produce foamed milk by emulsifying steam, air, and milk. A container 26 is positioned below the milk foaming device to receive a quantity of foamed milk discharged from the device 24. The milk foaming device 24 of the present invention controllably dispenses a quantity of foamed milk into the container 26 without splattering milk on the housing 28 of the espresso machine 20, the container 26 or the counter area 30 surrounding the espresso machine 20. As such the milk foaming device 24 of the present invention improves the presentation of the dispensed milk foam, the sanitation of the foam producing operation, and the cleanup of the device 24.

The milk foaming device 24 of the present invention includes an ingredient combining assembly 32, an emulsion chamber or swirl chamber 34 and a discharge tube 36. With further reference to FIG. 2, the ingredients combining assembly 32 includes a steam path (as represented by arrow 38), a milk path (as represented by arrow 40), and air path (as represented by arrow 42). The steam path 38 includes the steam wand 22 which delivers steam through fitting 23 inserted into an inlet end 25 of a housing 27 of the device 24. The milk path 40 extends from a milk reservoir (not shown) through tube 41 having end fitting 43 connected with inlet 45 of the ingredients combining assembly 32 where it is mixed with steam and air. The air path 42 includes an air flow regulator 44 inserted into air inlet 49 in the housing 27 to control the amount of air which is combined with the steam and milk. The housing 27 includes internal means providing a venturi action powered by the steam jet for drawing in the milk and air. The venturi means may be similar to that disclosed in either of the above prior art patents or of any other known construction.

The ingredients are combined in the ingredient combining assembly 32 and are injected into the swirl chamber 34. The swirl chamber 34 is a hollow generally cylindrical body in which the ingredients are blended. The blended ingredients swirl downwardly from the swirl chamber 34 into the discharge tube 36. As will be discussed in greater detail hereinbelow, a laminator 46 is positioned in the discharge tube 36 for directing the foamed milk downwardly out of the discharge tube 36. Foamed milk discharged from the milk foaming device 24 is directed into the container 26.

FIGS. 2 and 4 provide views of a dispensing assembly 48 of the present invention. The dispensing assembly 48 includes the dispensing tube 36 and the laminator 46. As can be seen in FIG. 4, the laminator 46 has a blade structure defining a pair of surfaces 50, 52 which face in opposite directions. The discharge tube 36 has a wall 54 forming a generally tubular shape defining a lumen 56. An upper end of the lumen 56, communicating with the swirl chamber 34, defines a receiving port 58. An end of the lumen 56 distal the receiving port 58 defines a discharge port 60. Milk flowing from the swirl chamber 34 to the discharge tube 36 passes through the receiving port 58. After traveling through the lumen 56 the foamed milk is directed from the discharge tube 36 through the discharge port 60.

In prior art milk foaming devices, bubble surfaces form over the discharge port 60 as foamed milk is being dispensed through the dispensing assembly 48. As the bubble surface grows, foamed milk builds up behind the bubble surface. Eventually, the force of the foamed milk behind the bubble surface overcomes the surface tension of the bubble surface at which point the bubble surface breaks. The foamed milk which builds up behind the bubble surface splatters from the device resulting in a splattering effect on the container, the espresso machine, and the surrounding surface.

The milk foaming device 24 of the present invention eliminates the splattering produced by the prior art devices, by interrupting the peripheral wall of the discharge tube so that it has a non-circular and axially variable or notched discharge end or edge. In the embodiment shown, this is achieved by including at least one concave notch 62 being formed through the wall 54 of the discharge tube 36. The concave notch 62 prevents or retards the formation of a bubble surface over the discharge port 60. In an alternate embodiment, a pair of concave notches 62 are provided at opposite sides of the tube. For example, the notch 62 in FIG. 4 would have a mirror image identical notch formed on the opposite side of the discharge tube 36. By eliminating the formation of a bubble surface over the discharge port 60, the present invention overcomes the undesirable effects of the prior art splattering problems. Elimination of splattering milk eliminates the time and effort required to clean up a container before presenting it to a customer, as well as, improves cleanup and sanitation.

Additional details regarding the structure and function of the dispensing assembly 48 is illustrated in a perspective view in FIG. 2, a planar elevational view in FIG. 3, and a side elevational view in FIG. 4. As shown in FIGS. 2 and 4, the discharge tube 36 is provided with a channel 64 for holding the laminator 46 in the lumen 56 of the discharge tube 36. During assembly, the laminator 46 is inserted into the lumen 56 along the central axis 66. The channel 64 is sized and dimensioned approximately equal to or slightly smaller than an edge 68 of the laminator 46 which is engaged with the channel 64. The laminator 46 retained in the channel 64 divides the lumen 56 into first and second chambers 70, 72. One chamber 70, has the concave notch 62 formed through the wall 54 generally opposite a corresponding plane 50 of the laminator 46. As such, the concave notch 62 associated with the chamber 70 prevents the formation of a bubble surface over the corresponding portion of the discharge port 60.

As shown in FIGS. 3 and 4, the laminator 46 positioned in the discharge tube 36 is generally symmetrically positioned relative to the discharge port 60. Each of the planar surfaces 50, 52 forms one of the surfaces of a corresponding chamber 70, 72. A tip end 74 of the laminator 46 extends beyond the discharge port 60. Additionally, distal edges 68, 76 of the laminator 46 have inwardly sloped sections 78, 80 which slope towards the central axis 66 terminating at a pointed but blunt, tipped end 82. The sloped sections 78, 80 promote the focusing of the flow of foamed milk from the discharge tube towards the blunt end 82. The blunt end 82 is formed generally perpendicular to the central axis 66.

In use, the milk foaming device 24 of the present invention is attached to a steam wand 22 of an espresso machine 20. The device 24 is operated to dispense a quantity of foamed milk into a container 26. The device 24 includes the dispensing assembly 48 including the laminator 46 retained in the lumen 56 of the dispensing tube 36. Milk, steam, and air are combined in the combining assembly 32 and swirled in the swirl chamber 34. The swirled or blended ingredients pass from the swirl chamber 34 into the dispensing assembly 48 through the receiving port 58.

Once in the dispensing tube 36, the foamed milk passes through the chambers 70, 72 of the lumen 56 between an inside surface 84 of the walls 54 in a corresponding planar surface 50, 52 of the laminator 46. Foamed milk tends to be pulled inwardly (as indicated by arrows 86) along the planes 50, 52 of the laminator 46. Foamed milk traveling towards the discharge port 60 is prevented from forming a bubble surface due to the interruption or concave notch 62 formed in the wall 54 of the discharge port 60. Milk flows downwardly out of the tube and along the planar surfaces 50, 52 and is directed inwardly (as indicated by arrows 75) into a more columnar flow (77) along the sloped sections 78, 80. The columnar flow is very important for targeting the foamed milk into container (especially espresso cups which may be quite small) with out creating a mess. The columnar flow is severed from the dispensing assembly at the reduced width or blunt discharge end 82 of the laminators 46.

The present invention retards or prevents the formation of bubble surfaces over the discharge port 60 of the discharge tube 36. By preventing the formation of bubble surfaces, the present invention does not splatter milk foam during a dispensing operation. The present invention employs the novel structure of the discharge tube 36 having at least one notch 62 and the laminator 46 to retard the formation of bubble surfaces over the discharge end 60 and to induce a columnar flow from the dispensing assembly 48. As such, the present invention neatly dispenses a quantity of milk foam into a container thereby eliminating the need for presentation and cleanup after dispensing each serving as well as general cleanup due to milk splattering.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A milk foaming device for emulsifying steam, milk and air to produce milk froth, said milk foaming device comprising:

an ingredients combining assembly for combining ingredients including steam, milk and air;

an emulsion chamber communicating with said ingredients combining assembly for blending said ingredients;

a discharge tube having walls defining a lumen, a first end of said lumen of said discharge tube defining a receiving port, said receiving port communicating with said emulsion chamber, and a second end of said lumen of said discharge tube, distal said first end, defining a discharge port through which milk froth exits said discharge tube;

said walls of said discharge tube at said discharge port having at least one interruption formed therethrough for preventing formation of bubble surfaces over said discharge end; and a laminator extending from said first end of said discharge tube through said lumen and beyond said discharge port at said second end of said discharge tube for inducing a columnar flow of milk froth from said discharge tube.

2. A milk foaming device as recited in claim 1, said laminator comprises a blade defining a pair of planar surfaces facing in opposite directions, said laminator blade being positioned in said lumen with one of said planar surfaces facing said interruption.

3. A dispensing assembly for use with a milk foaming device as recited in claim 2, wherein distal sides of said surfaces slope inwardly towards a tip of said laminator blade for promoting a focused columnar flow of milk froth from said discharge tube.

4. A dispensing assembly for use with a milk foaming device as recited in claim 1, wherein a tip of said laminator is blunt being formed generally perpendicular to a central axis of said discharge tube.

5. A dispensing assembly for use with a milk foaming device of the type having means for producing milk froth, said dispensing assembly comprising:

a discharge tube having walls defining a lumen, a first end of said lumen of said discharge tube defining a receiving port, said receiving port communicating with said milk forth producing means, and a second end of said lumen of said discharge tube, distal said first end, defining a discharge port through which milk froth exits said discharge port having at least one concave notch formed therethrough, said concave notch preventing formation of bubble surfaces over said discharge port;

a laminator blade extending from said first end of said discharge tube through said lumen for inducing a columnar flow of milk froth from said discharge tube.

6. A dispensing assembly for use with a milk foaming device of the type having means for producing milk froth, said dispensing assembly comprising:

a discharge tube having walls defining a lumen, a first end of said lumen of said discharge tube defining a receiving port, said receiving port communicating with said milk froth producing means, and a second end of said lumen of said discharge tube, distal said first end, defining a discharge port through which milk froth exits said discharge tube;

said walls of said discharge tube at said discharge port having at least one concave notch formed therethrough, said concave notch preventing formation of bubble surfaces over said discharge port; and a laminator blade extending from said first end of said discharge tube through said lumen and beyond said discharge port at said second end of said discharge tube for inducing a columnar flow of milk froth from said discharge tube.

7. A dispensing assembly for use with a milk foaming device as recited in claim 6, said laminator blade defining a pair of planar surfaces facing in opposite directions, said laminator blade being positioned in said lumen with each of said planar surfaces facing a corresponding concave notch.

8. A dispensing assembly for use with a milk foaming device as recited in claim 7, wherein distal sides of said surfaces slope inwardly towards a discharge end of said laminator blade for promoting a focused columnar flow of milk froth from said discharge tube.

9. A dispensing assembly for use with a milk foaming device as recited in claim 6, wherein a discharge end of said laminator blade is blunt being formed generally perpendicular to a central axis of said discharge tube.

10. A milk foaming device for emulsifying steam, milk and air to produce milk froth, said milk foaming device comprising:

an ingredients combining assembly for combining ingredients including a controllable steam nozzle, a controllable milk delivery conduit, and a controllable air supply conduit;

a generally cylindrical emulsion chamber communicating with said ingredients combining assembly for blending said ingredients, said combined ingredients being injected into and swirled in said emulsion chamber for producing an at least partially frothy volume of milk foam of desired consistency;

a discharge tube having walls defining a lumen, a first end of said lumen of said discharge tube defining a receiving port, said receiving port communicating with said emulsion chamber, and a second end of said lumen of said discharge tube, distal said first end, defining a dispensing port through which said volume of milk foam exits said discharge tube;

said walls of said discharge tube at said dispensing port having at least one notch formed therein for retarding formation of bubble surfaces over said dispensing port of said discharge tube to prevent splattering of milk foam; and a laminator blade extending from said first end of said discharge tube through said lumen and beyond said discharge port at said second end of said discharge tube, said laminator blade defining a pair of planar surfaces facing in opposite directions, said laminator blade being positioned in said lumen with one of said planar surfaces facing said at least one notch, said laminator blade drawing milk foam thereagainst to induce a columnar flow of milk foam from said discharge tube.

* * * * *